United States Patent
Kitago et al.

(10) Patent No.: US 9,598,552 B2
(45) Date of Patent: Mar. 21, 2017

(54) RUBBER COMPOSITION AND PNEUMATIC TIRE

(71) Applicant: SUMITOMO RUBBER INDUSTRIES, LTD., Kobe-shi, Hyogo (JP)

(72) Inventors: Ryota Kitago, Kobe (JP); Yuuki Kawana, Yokkaichi (JP)

(73) Assignee: Sumitomo Rubber Industries, Ltd., Kobi-shi (JP)

( * ) Notice: Subject to any disclaimer, the term of this patent is extended or adjusted under 35 U.S.C. 154(b) by 0 days.

(21) Appl. No.: 14/891,597

(22) PCT Filed: Jun. 11, 2014

(86) PCT No.: PCT/JP2014/065422
§ 371 (c)(1),
(2) Date: Nov. 16, 2015

(87) PCT Pub. No.: WO2014/200009
PCT Pub. Date: Dec. 18, 2014

(65) Prior Publication Data
US 2016/0083553 A1  Mar. 24, 2016

(30) Foreign Application Priority Data
Jun. 14, 2013 (JP) ................................ 2013-125290

(51) Int. Cl.
| C08K 3/04 | (2006.01) |
| B60C 1/00 | (2006.01) |
| C08L 21/00 | (2006.01) |
| C01B 31/02 | (2006.01) |

(52) U.S. Cl.
CPC .................. *C08K 3/04* (2013.01); *B60C 1/00* (2013.01); *C08L 21/00* (2013.01); *C01B 31/02* (2013.01); *C08K 2201/003* (2013.01)

(58) Field of Classification Search
CPC .................................... C08K 3/04; B60C 1/00
See application file for complete search history.

(56) References Cited

U.S. PATENT DOCUMENTS

| 5,124,396 A | 6/1992 | Branan, Jr. et al. |
| 5,202,373 A * | 4/1993 | Kawakumi ............. C08K 3/04 524/495 |
| 5,430,088 A | 7/1995 | Ohashi et al. |
| 5,985,977 A | 11/1999 | Aoki et al. |
| 6,787,595 B1 * | 9/2004 | Yamada ................... C08K 3/04 152/450 |
| 2003/0008954 A1 * | 1/2003 | Tadaki ..................... C08L 9/02 524/261 |
| 2006/0079625 A1 | 4/2006 | Sugiyama et al. |

FOREIGN PATENT DOCUMENTS

| JP | 7-34000 A | 2/1995 |
| JP | 11029718 A * | 2/1999 |
| JP | 2001-81239 A | 3/2001 |
| JP | 2005-336442 A | 12/2005 |
| JP | 2007131730 A * | 5/2007 |
| JP | 2009-24071 A | 2/2009 |
| JP | 2012-207233 A | 10/2012 |

OTHER PUBLICATIONS

Machine translation of JP 2007-131730 A, May 31, 2007.*
Machine translation of JP-11-29718-A dated Feb. 2, 1999.
Machine translation of JP-2001-81239-A dated Mar. 27, 2001.
Machine translation of JP-2005-336442-A dated Dec. 8, 2005.
Machine translation of JP-2009-24071-A dated Feb. 5, 2009.
Machine translation of JP-2012-207233-A dated Oct. 25, 2012.
Machine translation of JP-7-34000-A dated Feb. 3, 1995.
Translation of International Preliminary Report on Patentability for Application No. PCT/JP2014/065422 dated Jun. 11, 2014.

* cited by examiner

*Primary Examiner* — Vickey Nerangis
(74) *Attorney, Agent, or Firm* — Birch, Stewart, Kolasch & Birch, LLP

(57) ABSTRACT

The present invention provides rubber compositions that can achieve both abrasion resistance and low heat build-up properties, and pneumatic tires including such rubber compositions. The present invention relates to a rubber composition containing one or more carbon blacks, at least one of which is produced from a feedstock oil that has a BMCI value of not greater than 150 and an aliphatic hydrocarbon content of not less than 30% by mass.

7 Claims, No Drawings

RUBBER COMPOSITION AND PNEUMATIC TIRE

TECHNICAL FIELD

The present invention relates to rubber compositions and pneumatic tires including such rubber compositions.

BACKGROUND ART

When carbon black is added to rubber compositions, the properties of the rubber compositions are greatly affected by the physical properties of carbon black, including the specific surface area, structure, and surface properties. Thus, various carbon blacks with different properties are used depending on the required properties of the rubber composition, the environmental conditions under which the rubber composition is used, or the like (see Patent Literature 1, for example).

Tread rubbers, which contact the ground, are required to have excellent resistance to abrasion (abrasion resistance) during driving and also to exhibit low hysteresis loss upon deformation of the rubber during driving and, therefore, low heat build-up properties. Several methods have been investigated to achieve both abrasion resistance and low heat build-up properties as described above, such as a method in which a rubber composition is highly filled with carbon black or a method in which a carbon black with a high specific surface area (a small particle size) or a high structure is used. However, these uses of carbon blacks may result in insufficient low heat build-up properties although abrasion resistance is improved.

In order to improve abrasion resistance of tires by controlling properties other than the specific surface area and the structure of carbon black, a method of increasing the sharpness of the aggregate diameter distribution of carbon black has been proposed. However, a rubber composition containing such a carbon black may have deteriorated low heat build-up properties, and a tire with a tread formed from the rubber composition may have insufficient low heat build-up properties. Moreover, reducing the sharpness (increasing the broadness) of the aggregate diameter distribution can improve the low heat build-up properties of tires, but at the same time tends to lower the abrasion resistance. Thus, controlling only the aggregate diameter distribution of carbon black is also not an effective way to achieve both abrasion resistance and low heat build-up properties of tires.

As described above, abrasion resistance and low heat build-up properties have a trade-off relationship. Although developments have been made to achieve high levels of both properties, a carbon black imparting sufficient properties has not yet been found.

CITATION LIST

Patent Literature

Patent Literature 1: JP 2001-081239 A

SUMMARY OF INVENTION

Technical Problem

An object of the present invention is to solve the above problem and provide rubber compositions that can achieve both abrasion resistance and low heat build-up properties, and pneumatic tires including such rubber compositions.

Solution to Problem

After intensive studies, the present inventors have found that rubber compositions containing a carbon black having specific aggregate properties, such as a carbon black produced from a specific feedstock oil, achieve both abrasion resistance and low heat build-up properties. They thus have completed the present invention.

The present invention relates to a rubber composition, containing one or more carbon blacks, at least one of the one or more carbon blacks being produced from a feedstock oil that has a BMCI value of not greater than 150 and an aliphatic hydrocarbon content of not less than 30% by mass, the BMCI value being calculated by the following equation based on an average boiling point T (° C.) and a specific gravity D (60/60° F.) relative to water at 60° F.:

$$BMCI=48640/(T+273)+473.7D-456.8.$$

Preferably, the at least one of the one or more carbon blacks is produced from a feedstock oil that has a BMCI value of not less than 95 and an aliphatic hydrocarbon content of not greater than 60% by mass.

Preferably, an amount of aliphatic hydrocarbons derived from animal or vegetable oils or modified products thereof is not less than 10% by mass based on 100% by mass of aliphatic hydrocarbons in the feedstock oil.

Preferably, the feedstock oil contains tall oil.

Preferably, the at least one of the one or more carbon blacks is produced by a furnace process.

The present invention also relates to a rubber composition, containing one or more carbon blacks, at least one of the one or more carbon blacks having, as aggregate properties, a mode diameter (Dmod) of a Stokes' diameter distribution curve of not greater than 79 nm and a ratio ($\Delta$D50/Dmod) of a half width ($\Delta$D50) of the distribution curve to the Dmod of not less than 0.78.

The rubber compositions are each preferably used as a rubber composition for tires.

The present invention also relates to a pneumatic tire, formed from any of the rubber compositions.

Advantageous Effects of Invention

The rubber compositions of the present invention, which contain a specific carbon black, achieve both abrasion resistance and low heat build-up properties and provide pneumatic tires excellent in both properties.

DESCRIPTION OF EMBODIMENTS

A first aspect of the present invention relates to a rubber composition containing one or more carbon blacks, wherein at least one of the one or more carbon blacks is a carbon black (1) produced from a feedstock oil that has a BMCI value of not greater than 150 and an aliphatic hydrocarbon content of not less than 30% by mass, wherein the BMCI value is calculated by the following equation based on the average boiling point T (° C.) and the specific gravity D (60/60° F.) relative to water at 60° F.:

$$BMCI=48640/(T+273)+473.7D-456.8.$$

A second aspect of the present invention relates to a rubber composition containing one or more carbon blacks, wherein at least one of the one or more carbon blacks is a carbon black (1) having, as aggregate properties, a mode diameter (Dmod) of the Stokes' diameter distribution curve of not greater than 79 nm and a ratio (ΔD50/Dmod) of the half width (ΔD50) of the distribution curve to the Dmod of not less than 0.78.

According to the present invention, a carbon black with specific aggregate properties including a Dmod not greater than a specific value and a ΔD50/Dmod ratio not less than a specific value, for example, a carbon black (1) produced from a feedstock oil that has a BMCI value not greater than a specific value and an aliphatic hydrocarbon content not less than a specific value, is added to a rubber composition. This improves abrasion resistance while maintaining or improving good low heat build-up properties, thus enabling high levels of both abrasion resistance and low heat build-up properties to be achieved.

Examples of rubber materials that can be used as the rubber component in the present invention include diene rubbers such as isoprene-based rubbers, polybutadiene rubber (BR), styrene-butadiene rubber (SBR), and styrene-isoprene-butadiene rubber (SIBR). The rubber materials may be used alone or in combinations of two or more thereof. Among these, isoprene-based rubbers and BR are preferred, and isoprene-based rubbers are more preferred, because they can be used in tires to achieve a balanced improvement in handling stability, low heat build-up properties, elongation at break, adhesion to fiber cords, processability, and reversion resistance.

Examples of the isoprene-based rubber include polyisoprene rubber (IR), natural rubber (NR), and epoxidized natural rubber (ENR). Among these, NR is preferred because it is excellent in tire durability, adhesion to fiber cords, and the like. The NR may be any of those typically used in the tire industry, such as SIR20, RSS#3, or TSR20. The IR is not particularly limited and may be any of those typically used in the tire industry.

The amount of isoprene-based rubber based on 100% by mass of the rubber component is preferably not less than 20% by mass, more preferably not less than 30% by mass, still more preferably not less than 60% by mass. If the amount is less than 20% by mass, abrasion resistance, low heat build-up properties, and rubber strength may be insufficient. The amount may be 100% by mass. When the isoprene-based rubber is used in combination with other rubber materials, the amount of isoprene-based rubber is preferably not more than 70% by mass.

The BR is not particularly limited. Examples include high-cis BRs such as BR1220 available from Zeon Corp. and BR130B and BR150B available from Ube Industries, Ltd. and syndiotactic polybutadiene crystal-containing BRs such as VCR412 and VCR617 available from Ube Industries, Ltd. In particular, BR with a cis content of not less than 90% by mass is preferred because of its good abrasion resistance.

In the present invention, the carbon black (1) is used. The addition of the carbon black (1) enables both abrasion resistance and low heat build-up properties to be achieved.

In the second aspect of the present invention, the aggregate properties of the carbon black (1) includes a mode diameter (Dmod) of the Stokes' diameter distribution curve of not greater than 79 nm, preferably not greater than 69 nm, more preferably not greater than 63 nm. If the Dmod is greater than 79 nm, the effects of the present invention (particularly, the effect of improving abrasion resistance) are insufficient. The lower limit of the Dmod is not particularly limited, but is preferably not less than 50 nm, more preferably not less than 56 nm. If it is less than 50 nm, the carbon black (1) tends to have poor dispersibility, resulting in reduced tensile properties at break and reduced abrasion resistance.

In the second aspect of the present invention, the aggregate properties of the carbon black (1) includes a ratio (ΔD50/Dmod) of the half width (ΔD50) of the distribution curve to the Dmod of not less than 0.78, preferably not less than 0.90, more preferably not less than 1.0, still more preferably not less than 1.1. If the ratio is less than 0.78, the effects of the present invention (particularly, the effect of improving low heat build-up properties) are insufficient. The upper limit of the ΔD50/Dmod ratio is not particularly limited, but is preferably not greater than 2.5, more preferably not greater than 2.0. If it is greater than 2.5, abrasion resistance may be deteriorated, with the result that the desired effects cannot be obtained.

The Dmod and the ΔD50 of carbon black herein are determined by the following method.

A surfactant ("NONIDET P-40" available from SIGMA CHEMICAL) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("Ultrasonic Generator USV-500V" available from Ultrasonic Engineering Co., Ltd.) at a frequency of 200 kHz and an output power of 100 W for five minutes. Thus, carbon black slurries are prepared. Besides, 10 ml of a spin liquid (pure water) is poured into a centrifugal particle size distribution analyzer ("BI-DCP PARTICL SIZER" available from BROOKHAVEN INSTRUMENTS), and then 1 ml of a buffer solution (a 20% by volume aqueous solution of ethanol) is poured thereinto. Subsequently, 1 ml of each carbon black slurry prepared above is poured, and the mixture is subjected to centrifugal sedimentation at 8000 rpm to determine Stokes' diameter. Thus, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). Moreover, the middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width (ΔD50) of the distribution curve).

The carbon black (1) preferably has a cetyltrimethylammonium bromide adsorption specific surface area (CTAB) of 60 to 150 $m^2/g$, more preferably 80 to 145 $m^2/g$, still more preferably 100 to 140 $m^2/g$, particularly preferably 105 to 135 $m^2/g$. When the CTAB falls within the range described above, the effects of the present invention can be more suitably achieved.

The cetyltrimethylammonium bromide adsorption specific surface area (CTAB) of carbon black herein is determined in accordance with JIS K 6217-3:2001.

The carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range described above, the effect of improving abrasion resistance can be more suitably achieved and the effects of the present invention can be more suitably achieved.

The ratio (CTAB/IA) of the cetyltrimethylammonium bromide adsorption specific surface area (CTAB) to the iodine adsorption (IA) (mg/g) of the carbon black (1) is preferably 0.8 to 1.2 m$^2$/mg, more preferably 0.85 to 1.15 m$^2$/mg, still more preferably 0.9 to 1.1 m$^2$/mg. When the CTAB/IA ratio falls within the range described above, the effects of the present invention can be more suitably achieved.

The iodine adsorption (IA) of carbon black herein is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Accordingly, when the CTAB/IA ratio falls within the range described above, the carbon black can have a more significant reinforcing effect on the rubber component, and the effects of the present invention can be more suitably achieved.

The carbon black (1) preferably has a 24M4 dibutyl phthalate oil absorption (24M4 DBP) of 50 to 120 cm$^3$/100 g, more preferably 70 to 120 cm$^3$/100 g, still more preferably 90 to 115 cm$^3$/100 g, particularly preferably 95 to 110 cm$^3$/100 g. When the 24M4 DBP falls within the range described above, the effects of the present invention can be more suitably achieved.

The 24M4 dibutyl phthalate oil absorption (24M4 DBP) of carbon black herein is determined in accordance with ASTM D 3493-85a.

The carbon black (1) may be acidic, neutral, or basic, but preferably has a pH measured in accordance with JIS K 6220-1 of 2.0 to 10.0, more preferably 5.5 to 9.5. When the pH of the carbon black (1) falls within the range described above, mechanical strength and abrasion resistance of the rubber composition can be more suitably improved, and the effects of the present invention can be more suitably achieved.

The carbon black (1) may be preferably produced by, for example, a method characterized by using a feedstock oil (feedstock hydrocarbon) that has a BMCI value of not greater than 150 and an aliphatic hydrocarbon content of not less than 30% by mass. This method can suitably produce the carbon black (1) having the above properties. Further, this method allows the carbon black (1) with the above properties to be easily prepared in one pot, in other words, by using only the above feedstock oil to prepare the carbon black, without preparing and blending multiple carbon blacks or applying a post treatment, such as a surface treatment, to the prepared carbon black.

The BMCI value herein is calculated from the average boiling point T (° C.) and the specific gravity D (60/60° F.) relative to water at 60° F. by the equation below.

The average boiling point T refers to the temperature at which, in a distillation test of the feedstock oil, 50% by mass of the feedstock oil is distilled.

$$BMCI=48640/(T+273)+473.7D-456.8$$

In the first aspect of the present invention, the feedstock oil has a BMCI value of not greater than 150, preferably not greater than 140, more preferably not greater than 130, still more preferably not greater than 120, particularly preferably not greater than 110. If the BMCI value is greater than 150, the carbon black has too sharp a particle size distribution, failing to have the specific aggregate properties mentioned above and deteriorating low heat build-up properties. The lower limit of the BMCI value of the feedstock oil is not particularly limited, but is preferably not less than 95. If it is less than 95, the yield may deteriorate (an insufficient amount of carbon black may be obtained).

In the first aspect of the present invention, the aliphatic hydrocarbon content (the amount of aliphatic hydrocarbons based on 100% by mass of the feedstock oil) is not less than 30% by mass, preferably not less than 40% by mass. If the aliphatic hydrocarbon content is less than 30% by mass, the carbon black fails to have the specific aggregate properties mentioned above and deteriorates low heat build-up properties. The upper limit of the aliphatic hydrocarbon content is not particularly limited, but is preferably not greater than 60% by mass. If the aliphatic hydrocarbon content is greater than 60% by mass, the yield may deteriorate (an insufficient amount of carbon black may be obtained).

The amount of aliphatic hydrocarbons derived from animal or vegetable oils or modified products thereof is preferably not less than 10% by mass, more preferably not less than 20% by mass, still more preferably not less than 30% by mass based on 100% by mass of aliphatic hydrocarbons in the feedstock oil. The upper limit of the amount is not particularly limited, and may be 100% by mass. When the amount falls within the range described above, the effects of the present invention can be more suitably achieved and, additionally, since the effects can be achieved with inexhaustible resources as feedstocks, the depletion of resources and environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue) and (2) an aliphatic hydrocarbon(s). These may be modified. In particular, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuclei and the like of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing an aliphatic hydrocarbon can be suitably used as a feedstock oil. The coal hydrocarbon is preferably a coal aromatic hydrocarbon.

The carbon black (1) can be produced by known methods, except that the feedstock oil described above is used. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various carbon blacks with different properties can be produced by controlling conditions such as combustion conditions, the flow rate of the high-temperature combustion gas, the conditions for the introduction of the feedstock oil into the reaction furnace, and the time from the carbon black conversion to the termination of the reaction.

In the combustion zone, the air, oxygen, or a mixture thereof as oxygen-containing gas and a gaseous or liquid fuel hydrocarbon are mixed and combusted to form high-temperature combustion gas. Examples of the fuel hydrocarbon include petroleum liquid fuels such as carbon monoxide, natural gas, coal gas, petroleum gas, and heavy oil, and coal liquid fuels such as creosote oil. The combustion is preferably controlled so that the combustion temperature is in the range of 1400° C. to 2000° C.

In the reaction zone, a feedstock hydrocarbon is introduced into the high-temperature gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature gas stream having a flow rate in the range of 100 to 1000 m/s. The feedstock oil is preferably divided and introduced through two or more burners. Moreover, the reaction zone is preferably provided with a narrow portion to improve the reaction efficiency. The narrow portion preferably has a ratio of the narrow portion diameter to the diameter of the upstream part of the narrow portion of 0.1 to 0.8.

In the quench zone, water spraying or the like is performed to cool the high-temperature reaction gas to 1000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

The amount of the carbon black (1) to be added is preferably not less than 1 part by mass, more preferably not less than 5 parts by mass, still more preferably not less than 10 parts by mass, particularly preferably not less than 20 parts by mass. If the amount is less than 1 part by mass, the effects of the present invention tend to be insufficiently achieved. The amount of the carbon black is also preferably not more than 250 parts by mass, more preferably not more than 200 parts by mass, still more preferably not more than 150 parts by mass, particularly preferably not more than 100 parts by mass. If the amount is more than 250 parts by mass, the rubber composition tends to become too hard and end up having reduced abrasion resistance, and also tends to have extremely reduced processability. In addition, low heat build-up properties tend to deteriorate.

In the present invention, a carbon black other than the carbon black (1) (hereinafter, also referred to as a carbon black (2)) may be added in addition to the carbon black (1).

The carbon black (2) is not particularly limited. Examples include GPF, FEF, HAF, ISAF, and SAF.

When the rubber composition of the present invention is used as a rubber composition for treads, the carbon black (2) preferably has a nitrogen adsorption specific surface area ($N_2SA$) of not less than 80 $m^2/g$, more preferably not less than 90 $m^2/g$, still more preferably not less than 100 $m^2/g$. If the $N_2SA$ is less than 80 $m^2/g$, reinforcing properties tend to be reduced, resulting in insufficient abrasion resistance. The $N_2SA$ of the carbon black (2) is also preferably not greater than 200 $m^2/g$, more preferably not greater than 190 $m^2/g$, still more preferably not greater than 180 $m^2/g$. If the $N_2SA$ is greater than 200 $m^2/g$, low heat build-up properties tend to deteriorate. In addition, such a carbon black tends to have poor dispersibility, resulting in reduced tensile properties at break and reduced abrasion resistance.

The $N_2SA$ of carbon black herein is determined in accordance with JIS K 6217-2:2001.

When the rubber composition of the present invention is used as a rubber composition for treads, the carbon black (2) preferably has a dibutyl phthalate oil absorption (DBP) of not less than 40 ml/100 g, more preferably not less than 60 ml/100 g. If the DBP is less than 40 ml/100 g, reinforcing properties tend to be reduced, resulting in insufficient abrasion resistance. The DPB of the carbon black (2) is also preferably not more than 300 ml/100 g, more preferably not more than 200 ml/100 g, still more preferably not more than 100 ml/100 g. If it is more than 300 ml/100 g, durability and tensile elongation at break may deteriorate.

The DBP of carbon black herein is determined in accordance with JIS K 6217-4:2001.

When the rubber composition of the present invention is used as a rubber composition for sidewalls, carcasses, or clinches, the carbon black (2) preferably has a nitrogen adsorption specific surface area ($N_2SA$) of not less than 20 $m^2/g$, more preferably not less than 30 $m^2/g$. If the $N_2SA$ is less than 20 $m^2/g$, reinforcing properties tend to be reduced, resulting in insufficient durability. The $N_2SA$ of the carbon black (2) is also preferably not greater than 110 $m^2/g$, more preferably not greater than 100 $m^2/g$. If the $N_2SA$ is greater than 110 $m^2/g$, low heat build-up properties tend to deteriorate.

When the rubber composition of the present invention is used as a rubber composition for sidewalls, carcasses, or clinches, the carbon black (2) preferably has a dibutyl phthalate oil absorption (DBP) of not less than 40 ml/100 g, more preferably not less than 60 ml/100 g. If the DBP is less than 40 ml/100 g, reinforcing properties tend to be reduced, resulting in insufficient durability. The DBP of the carbon black (2) is also preferably not more than 300 ml/100 g, more preferably not more than 200 ml/100 g, still more preferably not more than 100 ml/100 g. If it is more than 300 ml/100 g, durability and fatigue resistance may deteriorate.

The total carbon black amount is preferably not less than 1 part by mass, more preferably not less than 5 parts by mass, still more preferably not less than 10 parts by mass, particularly preferably not less than 20 parts by mass based on 100 parts by mass of the rubber component. If the total amount is less than 1 part by mass, reinforcing properties may be insufficient. The total carbon black amount is also preferably not more than 250 parts by mass, more preferably not more than 200 parts by mass, still more preferably not more than 150 parts by mass, particularly preferably not more than 100 parts by mass. If the total amount is more than 250 parts by mass, processability may be reduced, and low heat build-up properties, abrasion resistance, and durability may be reduced.

The amount of the carbon black (1) based on 100% by mass of carbon blacks is preferably not less than 1% by mass, more preferably not less than 5% by mass, still more preferably not less than 10% by mass, particularly preferably not less than 20% by mass. If the amount is less than 1% by mass, the effects of the present invention may be insufficiently achieved, so that it may be difficult to achieve both abrasion resistance and low heat build-up properties. The amount may be 100% by mass. If the carbon black (1) is used in combination with other carbon blacks, the amount of the carbon black (1) is preferably not more than 80% by mass.

The rubber compositions of the present invention preferably contain oil. The addition of oil can decrease the E* (complex elastic modulus) while maintaining the tan δ (loss tangent) in dynamic viscoelasticity measurement, thus improving grip performance.

Examples of the oil include process oils, vegetable fats and oils, and mixtures thereof. Examples of process oils include paraffinic process oils, naphthenic process oils, and aromatic process oils. Examples of vegetable fats and oils include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil, and tung oil. Among these oils, aromatic process oils are preferred because they have compatibility with rubber and can also maintain the tan δ.

When the rubber composition contains oil, the amount of oil is preferably not less than 1 part by mass, more preferably not less than 3 parts by mass based on 100 parts by mass or the rubber component. If the amount is less than 1 part by mass, the effect of softening rubber (the softening effect) may be so small that the effect of lowering the E* may be reduced. The amount of oil is also preferably not more than 15 parts by mass, more preferably not more than 8 parts by mass. If the amount is more than 15 parts by mass, although the softening effect is sufficient, reinforcing properties may significantly decrease, resulting in reduced abrasion resistance and reduced durability (tensile properties at break). The amount of oil includes the amount of oil contained in the rubber (oil extended rubber).

The rubber compositions of the present invention may appropriately contain, in addition to the above-described components, additives typically used in production of rubber compositions. Examples of the additives include reinforcing fillers such as silica, clay, and talc, silane coupling agents, zinc oxide, stearic acid, processing aids, various kinds of antioxidants, wax, vulcanizing agents such as sulfur and sulfur-containing compounds, and vulcanization accelerators.

The rubber compositions of the present invention can be prepared by usual methods. Specifically, for example, the rubber composition may be prepared by kneading the above components with a Banbury mixer, a kneader, an open roll mill, or the like, and then vulcanizing the kneaded mixture.

The rubber compositions of the present invention can be used as rubber compositions for tires. In particular, they can be suitably used as rubber compositions for tires. The rubber compositions of the present invention can be used in various tire components, and particularly suitably used in treads, sidewalls, carcasses, clinches, and the like.

The pneumatic tires of the present invention can be formed from the rubber compositions by usual methods.

Specifically, the rubber composition containing the above components, before vulcanization, is extruded into the shape of a tire component such as a tread, and assembled with other tire components in a tire building machine by a usual method to build an unvulcanized tire, which is then heated and pressurized in a vulcanizer, whereby a tire is formed.

The pneumatic tires of the present invention can be suitably used as tires for passenger vehicles, tires for trucks and buses, tires for two-wheeled vehicles, high-performance tires, and the like, and particularly suitably used as high-performance tires. The pneumatic tires according to the present invention are excellent in grip performance on dry roads.

The term "high-performance tire" as used herein means a tire excellent particularly in grip performance on dry roads, and conceptually includes racing tires for racing vehicles.

EXAMPLES

The present invention is described in detail with reference to examples. The present invention is not limited to the examples.

[Carbon Black Production Equipment]

Carbon black production equipment was used in which a combustion zone, a feedstock introduction zone, and a rear reaction zone were joined in sequence, the combustion zone had an inner diameter of 500 mm and a length of 1750 mm and was provided with an air inlet duct and a combustion burner, the feedstock introduction zone was connected to the combustion zone and included a narrow portion with an inner diameter of 55 mm and a length of 700 mm provided with a feedstock nozzle penetrating into the portion from the periphery, and the rear reaction zone had an inner diameter of 200 mm and a length of 2700 mm and was provided with a quenching device.

[Production Conditions] (Furnace Process)

Carbon blacks were produced in this production equipment using natural gas as a fuel, oils and a petroleum hydrocarbon with properties shown in Table 1 as feedstock oils, and other conditions shown in Table 2. Table 2 also includes the yields and the properties of the carbon blacks prepared in the production examples. The properties of the carbon blacks were determined by the methods described above. The carbon blacks prepared in Production Examples 2 to 5 and 7 to 14 each correspond to the carbon black (1) described above. Production Examples 12 to 14 gave poor yields of carbon blacks, failing to yield evaluable amounts of carbon blacks. Thus, the amounts of the feedstock oils under these production conditions could not be determined, and these carbon blacks were not subjected to the measurement of properties and a test in which the carbon black is added to a rubber composition, which will be described later.

TABLE 1

| Oil | Manufacturer | BMCI | Aliphatic hydrocarbon content (% by mass) |
|---|---|---|---|
| Soybean oil | The Nisshin OilliO Group, Ltd. | 64 | 100 |
| Tall oil 1 | Harima Chemicals Group, Inc. | 96 | 40 |
| Tall oil 2 | Harima Chemicals Group, Inc. | 86 | 72 |
| Petroleum aliphatic hydrocarbon (PW-32) | Idemitsu Kosan Co., Ltd. | 21 | 100 |
| Creosote oil | Mitsubishi Chemical Corp. | 160 | 0 |

The chemicals used in examples and comparative examples are listed below.

NR: TSR20 (natural rubber)

Carbon blacks: carbon blacks prepared in Production Examples 1 to 11

Oil: Diana Process AH-24 available from Idemitsu Kosan Co., Ltd.

Zinc oxide: zinc oxide available from Mitsui Mining & Smelting Co., Ltd.

Stearic acid: stearic acid "TSUBAKI" available from NOF Corp.

Antioxidant: OZONONE 6C (N-(1,3-dimethylbutyl)-N'-phenyl-p-phenylenediamine) available from Seiko Chemical Co., Ltd.

TABLE 2

| | Production Example | | 1 | 2 | 3 | 4 | 5 | 6 | 7 | 8 |
|---|---|---|---|---|---|---|---|---|---|---|
| | Grade | | ISAF | ISAF | ISAF | ISAF | ISAF | SAF | SAF | SAF |
| Operation conditions | Amount of combustion air | Nm³/hr | 500 | 500 | 500 | 500 | 500 | 500 | 500 | 500 |
| | Oxygen content in combustion air | % | 27 | 27 | 27 | 27 | 27 | 27 | 27 | 27 |
| | Amount of natural gas | Nm³/hr | 43 | 43 | 43 | 43 | 43 | 43 | 43 | 43 |
| | Combustion gas temperature | ° C. | 1700 | 1700 | 1700 | 1700 | 1700 | 1700 | 1700 | 1700 |
| | Amount of feedstock oil | kg/hr | 118 | 88 | 80 | 96 | 81 | 118 | 78 | 72 |
| Feedstock oil formulation (parts by mass) | Soybean oil | | — | 40 | 60 | — | — | — | 40 | 60 |
| | Tall oil 1 | | — | — | — | — | — | — | — | — |
| | Tall oil 2 | | — | — | — | — | — | — | — | — |
| | Petroleum aliphatic hydrocarbon (PW-32) | | — | — | — | 30 | 40 | — | — | — |
| | Creosote oil | | 100 | 60 | 40 | 70 | 60 | 100 | 60 | 40 |
| Feedstock oil composition (% by mass) | Aliphatic hydrocarbon (Fatty oil) | | — | 40 | 60 | 30 | 40 | — | 40 | 60 |
| | | | — | 40 | 60 | — | — | — | 40 | 60 |
| | Aromatic hydrocarbon | | 100 | 60 | 40 | 70 | 60 | 100 | 60 | 40 |
| | Resin acid | | — | — | — | — | — | — | — | — |
| BMCI | | | 160 | 122 | 102 | 118 | 104 | 160 | 122 | 102 |
| Yield | | % by mass | 50 | 32 | 20 | 35 | 27 | 50 | 17 | 20 |
| Carbon black properties | Dmod | nm | 70 | 63 | 53 | 58 | 58 | 59 | 67 | 79 |
| | ΔD50 | nm | 53 | 68 | 68 | 53 | 65 | 43 | 66 | 113 |
| | 24M4DBP | cm³/100 g | 107 | 99 | 97 | 100 | 102 | 99 | 115 | 96 |
| | CTAB | m²/g | 118 | 117 | 116 | 108 | 114 | 124 | 127 | 128 |
| | CTAB/IA | m²/mg | 0.96 | 1.02 | 1.00 | 0.91 | 0.94 | 0.91 | 0.92 | 1.03 |
| | ΔD50/Dmod | | — | 0.76 | 1.08 | 1.29 | 0.91 | 1.12 | 0.73 | 0.99 | 1.43 |
| | pH | | — | 6.7 | 6.7 | 6.7 | 6.6 | 6.6 | 6.4 | 6.8 | 7.7 |

| | Production Example | | 9 | 10 | 11 | 12 | 13 | 14 |
|---|---|---|---|---|---|---|---|---|
| | Grade | | SAF | SAF | SAF | ISAF | ISAF | SAF |
| Operation conditions | Amount of combustion air | Nm³/hr | 500 | 500 | 500 | 500 | 500 | 500 |
| | Oxygen content in combustion air | % | 27 | 27 | 27 | 27 | 27 | 27 |
| | Amount of natural gas | Nm³/hr | 50.5 | 43 | 43 | 43 | 43 | 50.5 |
| | Combustion gas temperature | ° C. | 1900 | 1700 | 1700 | 1700 | 1700 | 1900 |
| | Amount of feedstock oil | kg/hr | 79 | 83 | 72 | — | — | — |
| Feedstock oil formulation (parts by mass) | Soybean oil | | — | — | — | 80 | 100 | — |
| | Tall oil 1 | | 100 | — | — | — | — | — |
| | Tall oil 2 | | — | — | — | — | — | 100 |
| | Petroleum aliphatic hydrocarbon (PW-32) | | — | 40 | 60 | — | — | — |
| | Creosote oil | | — | 60 | 40 | 20 | — | — |
| Feedstock oil composition (% by mass) | Aliphatic hydrocarbon | | 40 | 40 | 60 | 80 | 100 | 72 |
| | (Fatty oil) | | 40 | — | — | 80 | 100 | 72 |
| | Aromatic hydrocarbon | | — | 60 | 40 | 20 | — | — |
| | Resin acid | | 60 | — | — | — | — | 28 |
| BMCI | | | 96 | 104 | 77 | 83 | 64 | 86 |
| Yield | | % by mass | 13 | 27 | 20 | 10 | 2 | 5 |
| Carbon black properties | Dmod | nm | 61 | 51 | 43 | — | — | — |
| | ΔD50 | nm | 89 | 47 | 47 | — | — | — |
| | 24M4DBP | cm³/100 g | 104 | 103 | 98 | — | — | — |
| | CTAB | m²/g | 130 | 132 | 133 | — | — | — |
| | CTAB/IA | m²/mg | 1.06 | 0.88 | 0.84 | — | — | — |
| | ΔD50/Dmod | | 1.45 | 0.92 | 1.09 | — | — | — |
| | pH | | 7.3 | 6.7 | 6.1 | — | — | — |

Sulfur: powder sulfur available from Tsurumi Chemical industry Co., Ltd.
Vulcanization accelerator: NOCCELER NS (N-tert-butyl-2-benzothiazolylsulfenamide) available from Ouchi Shinko Chemical Industrial Co., Ltd.

Examples and Comparative Examples

An amount of 100 parts by mass of NR, 45 parts by mass of a carbon black (shown in Tables 3 and 4), 5 parts by mass of oil, 5 parts by mass of zinc oxide, 3 parts by mass of stearic acid, and 2 parts by mass of an antioxidant were kneaded using a BP-type Banbury mixer at 150° C. for 3 minutes to give a kneaded mixture. To the kneaded mixture were then added 2 parts by mass of sulfur and 1 part by mass of a vulcanization accelerator, and the mixture was kneaded with an open roll mill at 50° C. for 5 minutes to prepare an unvulcanized rubber composition.

The unvulcanized rubber composition was press-vulcanized at 170° C. for 12 minutes to prepare a vulcanized rubber composition.

The thus prepared vulcanized rubber compositions were subjected to the following evaluations. The results are shown in Tables 3 and 4. It should be noted that the reference comparative example in Table 3 is Comparative Example 1, and the reference comparative example in Table 4 is Comparative Example 2.

(Abrasion Resistance)

Lambourn abrasion loss was determined using a Lambourn abrasion tester at a temperature of 20° C., a slip ratio of 20%, and a test time of 2 minutes. The volume loss was then calculated from the Lambourn abrasion loss. The volume losses of the compositions are expressed as an index (Lambourn abrasion index), wherein the Lambourn abrasion index of the reference comparative example is 100. A higher Lambourn abrasion index indicates better abrasion resistance.

(Low Heat Build-Up Properties)

The loss tangent (tan δ) of the compositions was determined using a viscoelastic spectrometer VES (available from Iwamoto Seisakusho Co., Ltd.) at a temperature of 50° C., an initial strain of 10%, and a dynamic strain of 2%. The tan δ of the reference comparative example is taken as 100, and the tan δ of the other compositions are expressed as an index (rolling resistance index) using the equation below. A higher index indicates better rolling resistance properties (better low heat build-up properties). If the index value is 95 or greater, the rolling resistance properties are considered good.

(Rolling resistance index)=(tan δ of reference comparative example)/(tan δ of each composition)×100

TABLE 3

| | | Comparative Example 1 | Example 1 | Example 2 | Example 3 | Example 4 |
|---|---|---|---|---|---|---|
| | Carbon black used | Production Example 1 | Production Example 2 | Production Example 3 | Production Example 4 | Production Example 5 |
| Rubber properties | Abrasion resistance | 100 | 108 | 107 | 104 | 104 |
| | Low heat build-up properties | 100 | 96 | 98 | 109 | 106 |

TABLE 4

| | | Comparative Example 2 | Example 5 | Example 6 | Example 7 | Example 8 | Example 9 |
|---|---|---|---|---|---|---|---|
| | Carbon black used | Production Example 6 | Production Example 7 | Production Example 8 | Production Example 9 | Production Example 10 | Production Example 11 |
| Rubber properties | Abrasion resistance | 100 | 108 | 111 | 118 | 102 | 110 |
| | Low heat build-up properties | 100 | 97 | 117 | 107 | 102 | 104 |

Tables 3 and 4 show that the examples, in which a carbon black (1) was added, exhibited improved abrasion resistance while maintaining or improving good low heat build-up properties, thus achieving high levels of both abrasion resistance and low heat build-up properties.

The invention claimed is:
1. A rubber composition, comprising;
a rubber component and one or more carbon blacks, wherein
at least one of the one or more carbon blacks is produced from a feedstock oil that has a BMCI value of not less than 96 but not greater than 122 and an aliphatic hydrocarbon content of not less than 30% by mass but not greater than 60% by mass,
the at least one of the one or more carbon blacks produced from a feedstock oil having the above BMCI value and aliphatic hydrocarbon content is present in the rubber composition in an amount of 5 to 250 parts by mass per 100 parts by mass of the rubber component, and
the BMCI value is calculated by the following equation based on an average boiling point T (° C.) and a specific gravity D (60/60° F.) relative to water at 60° F.:

$BMCI=48640/(T+273)+473.7D-456.8.$

2. The rubber composition according to claim 1, wherein an amount of aliphatic hydrocarbons derived from animal or vegetable oils or modified products thereof is not less than 10% by mass based on 100% by mass of aliphatic hydrocarbons in the feedstock oil.

3. The rubber composition according to claim 1, wherein the feedstock oil comprises tall oil.

4. The rubber composition according to claim 1, wherein the at least one of the one or more carbon blacks is produced by a furnace process.

5. The rubber composition according to claim 1, wherein the rubber composition comprises an isoprene-based rubber.

6. The rubber composition according to claim 1, which is used as a rubber composition for tires.

7. A pneumatic tire, formed from the rubber composition according to claim 6.

* * * * *